Oct. 28, 1947.    H. W. PORTER ET AL    2,429,895
STOP MECHANISM FOR LEVER OPERATED TOOLS
Filed April 5, 1944
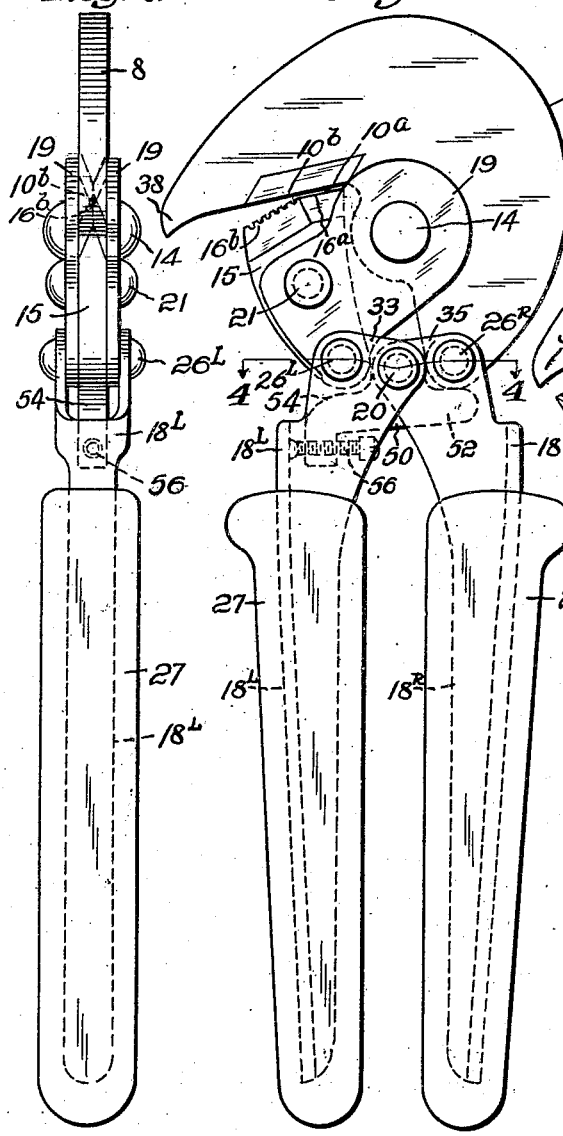
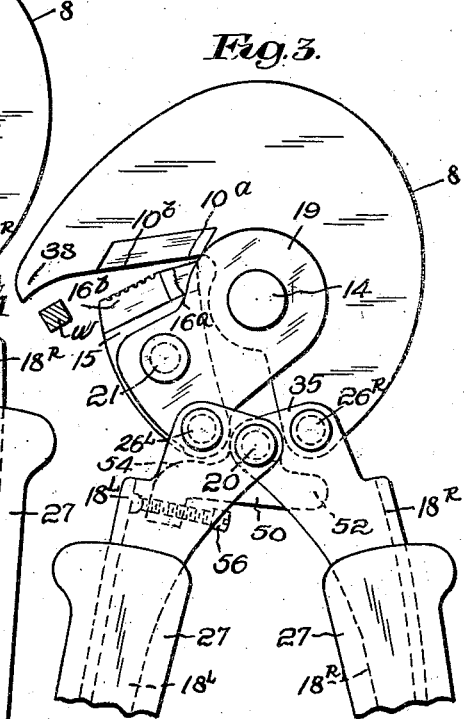
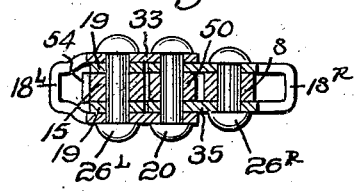
Inventors:
Henry W. Porter,
John W. Geddes,
by Emery, Booth, Townsend, Miller & Weidner
Attys Patented Oct. 28, 1947

2,429,895

UNITED STATES PATENT OFFICE 2,429,895

STOP MECHANISM FOR LEVER OPERATED TOOLS

Henry W. Porter, Brookline, and John W. Geddes, Boston, Mass., assignors to H. K. Porter, Inc., Everett, Mass., a corporation of Massachusetts Application April 5, 1944, Serial No. 529,638

3 Claims. (Cl. 30—238)

This invention relates to lever operated tools and the object is to provide a tool having incorporated therein an improved arrangement for limiting the approximation of the operating handles, which in the usual case may be considered as equivalent to limiting the approach of the two working jaws, as, for example, the opposed edges of a cutting tool of the nipper type.

Our invention will be well understood by the following description of the illustrative embodiment thereof shown by way of example in the accompanying drawings, wherein—

Fig. 1 is a plan of the tool in closed position;

Fig. 2 is an edge view thereof as seen from the left of Fig. 1;

Fig. 3 is a plan of the head portion of the tool with the jaws open; and

Fig. 4 is a section on the line 4—4 of Fig. 1.

While the stop mechanism of our invention may be incorporated in lever-operated tools of various forms, it is here illustrated in connection with a wire cutter for military use which from one point of view may be considered as exemplifying in a tool operable with one hand the cutting action disclosed in the patent to Porter 1,348,735. We shall first describe in a general way the construction of tool illustrated in order that the incorporation of the stop mechanism proper in a lever tool and the action of such mechanism may be understood. Referring, therefore, particularly to Figs. 1 and 2, the tool may comprise a head lever 8, preferably a flat-sided piece of steel in the general form of an inverted J, the overhanging arm of which is provided with a downwardly facing cutting edge comprising an inner or proximal part 10a and an outer or distal part 10b, which in the example shown are disposed in the same straight line. In the longer arm of the J a hole is provided to receive the main pivot pin 14, the center of the opening being offset from the line of the cutting edge 10 for a purpose which will appear, while the terminus of this arm, forming the tail of the lever, receives the pivot pin 26R. Cooperating with the head lever 8 is a companion lever which herein comprises a part 15 which may be a simple flat-sided piece of suitable steel of generally oblong form as shown adapted to be received beneath the overhanging arm of the J and having at its upper end a proximal cutting edge 16a and a distal edge 16b. A pair of cheek pieces 19 are pivotally secured to the lever 8 by the pivot pin 14 and extend at either side of the part 15 and are rigidly secured thereto as by means of a rivet 21 adjacent the upper portion of the part 15 and the pivot 26L which traverses the tail or lower portion of this part and corresponding depending portions of the cheek pieces 19 which overlie it on either side.

The head levers are actuated by bent or cranked handle levers 18R and 18L, the combination constituting a compound-lever actuating system for the jaws which is broadly of known type. Herein these levers comprise sheet metal handle portions proper in the form of channels with inwardly facing flanges which at the upper ends of the handle portions proper receive between them the tails of the head levers 8 and 15 and in the case of the left-hand lever 18L the depending portions of the cheek pieces 19. The flanges extend inwardly to form the shorter arms of the bent levers, the pair of flanges 33 of the left-hand lever receiving between them the pair of flanges 35 of the right-hand lever and being joined thereto by the pivot 20. The main portions of the handle portions proper are here shown as provided with insulating covers 27 of rubber or similar material.

In accordance with the invention means are provided to limit the closing movement of the tool and thus in the instant case prevent undue fretting of the edges 10a and 16a one against the other. For this purpose we may provide a member which, considered as a whole, may be said to be housed between the flanges of the handle members. It consists of a member 50 pivoted on the pivot 20 and having an arm 52 adapted to fit against the tail of the right-hand jaw 8 in the closed position of the parts (Fig. 1) and an arm 54 extending to the left and downwardly to oppose the web of the channel of the left-hand handle, this arm receiving an adjusting screw 56 which makes contact with the web. Thus in the closed position of the parts, as shown in Fig. 1, a strut is interposed between the web of the left-hand handle and the tail of the right-hand jaw carried by the right-hand handle which prevents further closing movement of the jaws and handles beyond the position illustrated in that figure.

We are aware that the invention may be embodied in other specific forms without departing from the spirit or essential attributes thereof, and we therefore desire the present embodiment to be considered in all respects as illustrative and not restrictive, as is in fact clear in several matters from the description itself. Reference is to be had to the appended claims to indicate those principles of the invention exemplified by the particular embodiment described and which we desire to secure by Letters Patent.

We claim:

1. A lever tool having handle members of general channel form, portions of the flanges of the respective members overlapping and being traversed by a pivot and an adjustable handle stop element received between the flanges of the channels and carried by the pivot.

2. A lever tool having handle members provided with cooperating pairs of flanges through which a pivot extends, and a member suspended on said pivot between the pairs of flanges and having ends presented to parts of the tool which move toward each other in closing movement of the tool, one of the ends carrying an adjustable abutment screw to engage the adjacent part.

3. A compound lever tool comprising handle members having bifurcated ends pivoted together and receiving between them the tails of head levers respectively, a detent swung on the pivot which joins the members and opposing the tail of one of the head levers, the member having an extension to abut the handle to which the other head lever is connected.

HENRY W. PORTER.
JOHN W. GEDDES.

REFERENCES CITED

The following references are of record in the file of this patent:

UNITED STATES PATENTS

| Number | Name | Date |
| --- | --- | --- |
| 2,239,852 | Lind | Apr. 29, 1941 |
| 1,972,515 | Eyre | Sept. 4, 1934 |
| 2,308,684 | Geddes | Jan. 19, 1943 |
| 1,648,984 | Enell | Nov. 15, 1927 |